United States Patent [19]

Nakazima et al.

[11] Patent Number: 4,863,996

[45] Date of Patent: Sep. 5, 1989

[54] NOVEL IMPACT-RESISTANT POLYAMIDE RESIN COMPOSITION AND PROCESS FOR PRODUCING THE SAME

[75] Inventors: Osamu Nakazima, Yokohama; Shinichi Izawa, Tokyo, both of Japan

[73] Assignee: Asahi Kasei Kogyo Kabushiki Kaisha, Osaka, Japan

[21] Appl. No.: 28,598

[22] Filed: Mar. 20, 1987

[51] Int. Cl.$^4$ .................. C08L 53/00; C08L 71/04
[52] U.S. Cl. .................. 525/92; 525/397; 525/905
[58] Field of Search .................. 525/92, 905, 391

[56] References Cited

U.S. PATENT DOCUMENTS

| | | |
|---|---|---|
| 4,085,163 | 4/1978 | Gergen . |
| 4,315,086 | 2/1982 | Ueno et al. . |
| 4,421,892 | 12/1983 | Kasahara et al. . |
| 4,600,741 | 7/1986 | Aycock et al. . |
| 4,654,405 | 3/1987 | Jalbert et al. . |

FOREIGN PATENT DOCUMENTS

| | | | |
|---|---|---|---|
| 0046040 | 2/1982 | European Pat. Off. . | |
| 0147874 | 7/1985 | European Pat. Off. . | |
| 0231626A1 | 8/1987 | European Pat. Off. . | |
| 49753 | 5/1981 | Japan .................. | 525/92 |
| 59-59724 | 4/1984 | Japan . | |
| 59-66452 | 4/1984 | Japan . | |
| 59-86653 | 5/1984 | Japan . | |
| 61-204262 | 9/1986 | Japan . | |
| 62-138553 | 6/1987 | Japan . | |
| 2054623A | 2/1981 | United Kingdom . | |

OTHER PUBLICATIONS

Robert R. Gallucci, "Polyphenylene Ether-Polyamide Blends", ANTEC (1986), pp. 48–50.
Tokai Symposium on "Material Characterization and Material Design", Jan., 1987, pp. 53–58.
Plastic Age, No. 2, pp. 160–163, (1986).
PCT/US 86/01511, 01/1987; General Electric Co.

*Primary Examiner*—Jacob Ziegler
*Attorney, Agent, or Firm*—Birch, Stewart, Kolasch & Birch

[57] ABSTRACT

An impact-resistant polyamide resin composition which comprises (a) a polyamide resin (hereinafter abbreviated as PA),
(b) a polyphenylene ether type resin (hereinafter abbreviated as PPE), and
(c) a hydrogenated block copolymer type elastomer (hereinafter abbreviated as TPE) which is a copolymer containing a vinyl aromatic compound polymer block A and an olefinic compound polymer block B, the degree of unsaturation of the block B not exceeding 20%, the diameter of the dispersed phase of PPE dispersed in the said composition being 0.6 μm or less, and the insoluble portion of the composition remaining after extraction thereof with formic acid followed by chloroform being 20% by weight or more relative to the total amount of PPE and TPE present in the composition, and a process for producing the same.

4 Claims, 13 Drawing Sheets

FIG. I 1.0μm 1.0 μm 1.0μm 1.0μm 1.0μm 1.0μm 1.0μm 1.0μm 1.0μm

F I G. 13
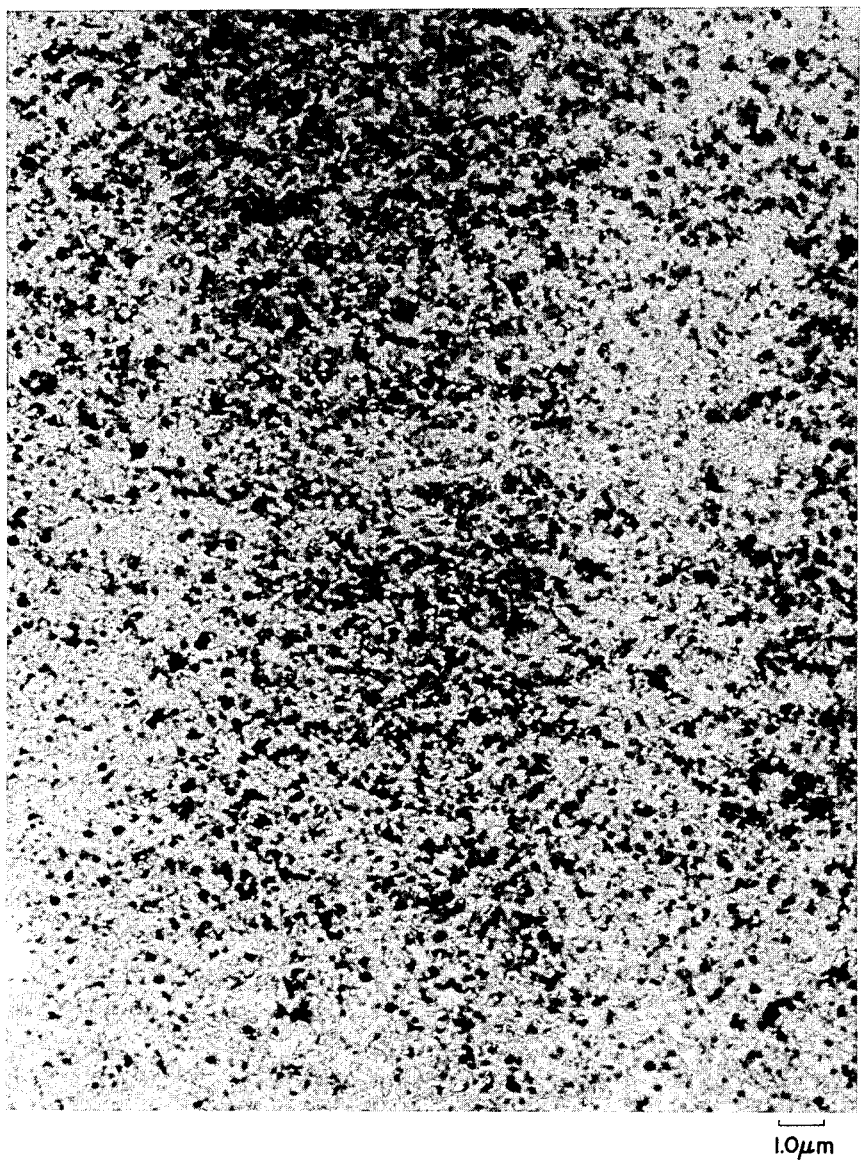
1.0μm

NOVEL IMPACT-RESISTANT POLYAMIDE RESIN COMPOSITION AND PROCESS FOR PRODUCING THE SAME

FIELD OF THE INVENTION AND RELATED PRIOR ART STATEMENT

The present invention relates to a polyamide resin composition with an excellent impact resistance, particularly at a low temperature, and a thermal resistance as well as a low level of anisotropy of mechanical properties. More particularly, the present invention relates to a polyamide resin composition which comprises (a) a polyamide resin, (b) a polyphenylene ether type resin and (c) a hydrogenated block copolymer type elastomer which is a copolymer comprising a vinyl aromatic compound polymer block A and an olefinic compound polymer block B, the degree of unsaturation of the block B not exceeding 20%. The composition can be used in a wide field including the field of materials for the automotive, electric, electronic, and mechanical industry.

Although polyamide resins have excellent mechanical properties, chemical resistance, abrasion resistance, etc., they are poor in impact resistance, particularly impact resistance at a low temperature. Accordingly, polyamide resin have been restricted as to their field of applications.

Various compositions have been proposed to obviate the above-mentioned drawback. Compositions incorporated with elastomers have been disclosed (Japanese patent application Kokoku (Post-Exam. Publn.) No. 11,941/85, Japanese patent application Kokai (Laid-Open) Nos. 7,443/83 and 56,451/84, and other), but such compositions have the drawback of being poor in impact strength at low temperatures. Further, these compositions have another drawback of decreased thermal resistance owing to the incorporation of elastomers.

Japanese patent application Kokai (Laid-Open) No. 49,753/81 discloses a composition which comprises 100 parts by weight of resin (I) consisting of 5 to 95% by weight of polyphenylene oxide and 95 to 5% by weight of polyamide, 5 to 100 parts by weight of a rubber-like substance (II), and 0.01 to 50 parts by weight of a compound having in the molecule simultaneously (a) a carbon-carbon double bond or a carbon-carbon triple bond, and (b) a carboxylic acid group, acid anhydride group, acid amide group, imido group, carboxylic ester group, epoxy group, amino group or hydroxyl group and which undergoes no phase separation in molding and is excellent in solvent resistance and impact strength and is hence of high practical value. However, the composition is unsatisfactory in low temperature impact resistance.

U.S. Pat. No. 4,315,086 discloses a composition excellent in solvent resistance and impact resistance which comprises 100 parts by weight of resin (I) consisting of 5 to 95% by weight of polyphenylene oxide and 95 to 5% by weight of polyamide, and 0.01 to 30 parts by weight of at least one substance selected from (A) liquid diene polymers, (B) epoxy compounds, and (C) compounds having simultaneously (a) an ethylenic carbon-carbon double bond or a carbon-carbon triple bond and (b) a carboxylic acid group, acid anhydride group, acid amide group, imido group, carboxylic ester group, amino group or hydroxyl group, but it has an unsatisfactory low temperature impact strength.

U.S. Pat. No. 4,421,892 discloses a composition excellent in thermal resistance and impact strength which comprises 5 to 95% by weight of an aromatic polyether type resin, 0.5 to 90% by weight of a copolymer containing as its components a styrene type compound and an α,β-unsaturated dicarboxylic acid anhydride, 1 to 90% by weight of polyamide, and 0 to 80% by weight of an impact strength reinforcing material. However, this composition is not excellent in low temperature impact strength and is also unsatisfactory in thermal resistance.

U.S. Pat. No. 4,600,741 discloses a composition excellent in chemical resistance and impact resistance which comprises a polyphenylene ether resin, a polyamide resin, and a polyphenylene ether resin modified with an acyl compound comprising (i) a structure of the general formulas

wherein X denotes F, Cl, Br, I, or OH, and/or

wherein R denotes a hydrogen atom, alkyl radical, or aryl radical, and (ii) one member selected from a carboxylic acid, acid anhydride, acid amide, carboxylic ester, amine, and hydroxyl group, said (i) and (ii) being covalent-bonded through a divalent hydrocarbon radical. However, even when the composition is further incorporated with impact resistance improving agents such as natural rubber, polybutadiene, butadiene/styrene copolymer, and hydrogenated butadiene/styrene copolymer, the resulting composition is still unsatisfactory in low temperature impact resistance.

Among compositions comprising polyphenylene ether resin and polyamide resin, Noryl GTX (a trade name, mfd. by General Electric Co.) is commercially available as a material for automobile outer panels. The features of this PPE/PA type polymer alloy is described in Plastic Age, No. 2, 160–163 (1986). Noryl GTX 910 has an impact strength at $-30°$ C. of about 13 kg·cm/cm and a thermal resistance, as expressed in terms of heat distortion temperature (4.6 kg/cm$^2$ load), of 190° C. The alloy assumes a form wherein PPE is micro-dispersed in the continuous phase of PA, and comprises an utterly incompatible microdispersions when judged from the determination of its dynamic viscoelasticity. As to the details of its phase structure, it is described in the Proceedings, p. 53–58 (Jan. 1987), of Tokai Symposium on "Material Characterization and Material Design" sponsored by the Tokai Branch of The Soc. of Polymer Science, Japan that it assumes a state featured by, so to call it, a sea-island-lake-like structure wherein PPE is dispersed in the continuous phase of PA and further rubber is dispersed in said PPE, and the dispersed particles of PPE have mostly a particle diameter of 2 to 4 μm.

The present inventors have previously found, as a composition of polyamide resin excellent in impact strength and rigidity, a composition characterized by comprising (A) not less than 10% by weight and not more than 35% by weight of at least one copolymer selected from the group consisting of styrene type hydrocarbon polymer block-conjugated diene type elastomer block copolymers and styrene type hydrocarbon polymer block-olefin type elastomer block copolymers, (B) not less than 2% by weight and not more than the percentage by weight of (A) of a maleic anhydride-modified polyphenylene ether type resin, and (C) not less than 30% by weight and not more than 88% by weight of a polyamide resin [Japanese patent application Kokai (Laid-Open) No. 204,262/86]. However, when the above-mentioned composition is processed by conventional forming methods such as injection molding, the resulting formed articles show so called anisotropy of mechanical properties, a phenomenon wherein mechanical properties differ markedly between the direction of resin flow and the direction perpendicular to the former. Accordingly, in practical applications, the composition is restricted as to forming methods and uses.

In recent years, requirements for improving the impact resistance of polyamide resin have increased further as the resin has come to be more widely used. Impact resistance is usually expressed in terms of Izod impact strength. When polyamide resin is use singly, its Izod impact strength is several to about 10 kg·cm/cm (with notch; determined under an absolute dry condition) at 23° C. and decreases down to 2 to 3 kg·cm/cm or less at lower temperatures. Accordingly, the field of application of the resin alone is subject to limitation.

OBJECT AND SUMMARY OF THE INVENTION

The object of the present invention is to improve the impact resistance and polyamide resin. More particularly, it is to provide a polyamide resin composition which has an improved low temperature impact resistance while retaining a high level of thermal resistance and which shows a low-level of anisotropy of mechanical properties when formed or molded.

After extensive studies conducted to obtain such an improved resin composition, the present inventors have found a novel polyamide resin composition which can achieve the object of the present invention.

Thus, the present invention relates, in one aspect, to an impact-resistant polyamide resin composition which comprises (a) a polyamide resin (hereinafter abbreviated as PA),
(b) a polyphenylene ether type resin (hereinafter abbreviated as PPE), and
(c) a hydrogenated block copolymer type elastomer (hereinafter abbreviated as TPE) which is a copolymer containing a vinyl aromatic compound polymer block A and an olefinic compound polymer block B, the degree of unsaturation of the block B not exceeding 20%, the diameter of the dispersed phase of PPE dispersed in the said composition being 0.6 μm or less, and the insoluble portion of the composition remaining after extraction thereof with formic acid followed by chloroform being 20% by weight or more relative to the total amount of PPE and TPE present in the composition.

In another aspect, the present invention relates to a process for producing an impact-resistant polyamide resin composition comprising (a) a polyamide resin,
(b) a polyphenylene ether type resin, and
(c) a hydrogenated block copolymer type elastomer which is a copolymer containing a vinyl aromatic compound polymer block A and an olefinic compound polymer block B, the degree of unsaturation of the block B not exceeding 20%, the diameter of the dispersed phase of PPE dispersed in the said composition being 0.6 μm or less, and the insoluble portion of the composition remaining after extraction thereof with formic acid followed by chloroform being 20% by weight or more relative to the total amount of PPE and TPE present in the composition which process comprises melt-kneading a polyphenylene ether type resin obtained by reacting, in the presence of a radical producing agent, a 1,2-substituted olefinic compound having an acid anhydride structure with a polymer obtained by oxidative polymerization of at least one phenolic compound represented by the general formula

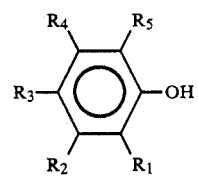

wherein $R_1$, $R_2$, $R_3$, $R_4$ and $R_5$ are, independently, a hydrogen atom, halogen atom, or substituted or unsubstituted hydrocarbon group, provided that at least one of them must be hydrogen, a hydrogenated block copolymer type elastomer obtained by reacting, in the presence of a radical producing agent, a 1,2-substituted olefinic compound having an acid or an acid anhydride structure with a hydrogenated block copolymer comprising a vinyl aromatic compound polymer block A and an olefinic compound polymer block B, the degree of unsaturation of the said block B not exceeding 20%, and a polyamide resin.

BRIEF DESCRIPTION OF THE DRAWINGS

FIGS. 1 to 3 and 5 to 13 are electron photomicrographs of the compositions of Examples of this invention and Comparative Examples which have been stained with osmium tetroxide. Deeply stained portions are dispersed phases of PPE, whereas white, not stained portions are the dispersed phase of TPE. Portions with scattered micro dots are PA phases.

DESCRIPTION OF THE PREFERRED EMBODIMENT

Figure 1:
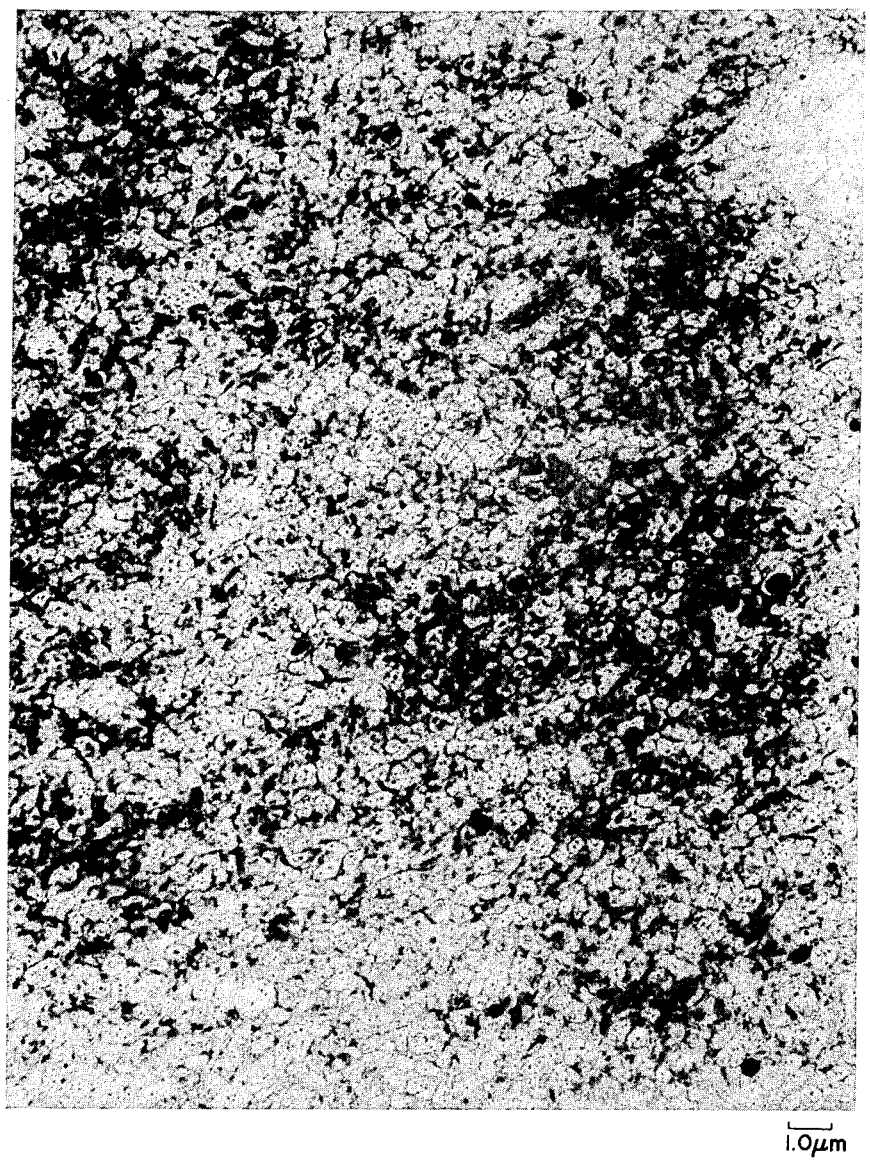

The polyamide resins which can be used in the present invention include polycondensation products of a dicarboxylic acid with a diamine, polycondensation products of an α-aminocarboxylic acid, and ring opening polymerization products of a cyclic lactam. As specific examples thereof, there may be mentioned aliphatic polyamides such as nylon 6, nylon 4,6, nylon 6,6, nylon 6,10, nylon 11, and nylon 12; aliphatic-aromatic polyamides such as poly(hexamethylene terephthalamide), poly(hexamethylene isophthalamide), and poly(tetramethylene isophthalamide); and the copolymers and mixture thereof.

The polyphenylene ether type resin used in the present invention is a polymer obtained by the oxidative polymerization of at least one phenolic compound represented by the general formula

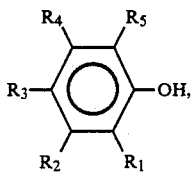

wherein $R_1$, $R_2$, $R_3$, $R_4$ and $R_5$ are, independently, a hydrogen atom, halogen atom, or substituted or unsubstituted hydrocarbon group, provided that at least one of them must be hydrogen. That is, said polymer may include any of the products obtainable by oxidative polymerization of phenolic compounds.

Specific examples of $R_1$, $R_2$, $R_3$, $R_4$ and $R_5$ in the above general formula include hydrogen, chlorine, fluorine, bromine, iodine, methyl, ethyl, propyl, butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, and ethylphenyl.

Specific examples of the compound represented by the above general formula include phenol, o-, m- or p-cresol, 2,6-, 2,5-, 2,4- and 3,5-dimethylphenol, 2-methyl-6-phenylphenol, 2,6-diphenylphenol, 2,6-diethylphenol, 2-methyl-6-ethylphenol, and 2,3,5-, 2,3,6- and 2,4,6-trimethylphenol. These phenolic compounds may also be used in combinations of two or more kinds thereof.

The phenolic compounds of the above general formula may also be copolymerized with phenolic compounds other than those of the said formula, such as bisphenol A, tetrabromobisphenol A, resorcinol, and hydroquinone.

It is well known that polymers of phenolic compound can be obtained by oxidatively polymerizing the compound by means of oxygen or an oxygen-containing gas using an oxidative coupling catalyst. For example, polymers can be obtained by reacting phenolic compounds with oxygen in the presence of a copper or manganese complex.

Further, there can also be used a graft copolymer obtained by grafting a styrene type compound to the above-mentioned phenolic compound polymer. Examples of the styrene type compound include styrene, α-methylstyrene, methylstyrene, vinyltoluene, and chlorostyrene.

Further, to improve processability, styrene type polymers may be added within a range not detrimental to the mechanical properties of the product. As specific examples of such styrene type polymers, there may be mentioned styrene homopolymer; rubber-modified polystyrene resins using various kinds of rubbers, for example, polystyrene modified with butadiene type rubber (of various content of microstructures), polystyrene modified with acrylic rubber, polystyrene modified with ethylenepropylene copolymer, polystyrene modified with ethylenepropylene-diene copolymer rubber, and polystyrene modified with butadiene-styrene rubber; styrene-acrylonitrile copolymer, butadiene-styrene-acrylonitrile copolymer (so-called ABS resin), butadiene-styrene-methyl methacrylate copolymer, and styrene-ethylene copolymer.

The hydrogenated block copolymer type elastomer used in the present invention is a hydrogenated block a copolymer containing a vinyl aromatic compound polymer block A and an olefinic compound polymer block B, the degree of unsaturation of the block B not exceeding 20%.

The hydrogenated block copolymer containing a vinyl aromatic compound polymer block A and an olefinic compound polymer block B, used in the present invention, is obtained by selective hydrogenation of the conjugated diene portions of a block copolymer containing a vinyl aromatic compound polymer block and a conjugated diene type compound polymer block.

Among the above-mentioned block copolymer containing a vinyl aromatic compound polymer block and a conjugated diene type compound polymer block, there may be mentioned a linear block copolymer represented by the formulas $(X-Y)_n$, $(X-Y-X')_n$, $X(Y-X-Y)_{\overline{n}}X$, or $X(Y-X)_{\overline{n}}Y$ (n is an integer from 1 to 10) which is a copolymer consisting of a vinyl aromatic compound polymer blocks (X) and (X') and a conjugated diene type compound polymer block (Y) (X and X' may be the same or different), and a radial block copolymer represented by the general formulas $[(Y-X)_{\overline{n}}]_{\overline{m+2}}Z$, $[(X-Y)_{\overline{n}}]_{\overline{m+2}}Z$, $[(Y-X)_n-Y]_{\overline{m+2}}Z$ or $[(X-Y)_n-X]_{\overline{m+2}}Z$ (wherein X, Y and n are as defined above; m is an integer from 1 to 4; and Z is the residue of a coupling agent such as silicon tetrachloride and tin tetrachloride or that of an initiator such as a polyfunctional organolithium compound).

Typical examples of vinyl aromatic compounds used herein include styrene, α-methylstyrene, vinylxylene, ethylvinylxylene, vinylnaphthalene, and the mixtures thereof. Those of conjugated diene type compounds include butadiene, isoprene, 1,3-pentadiene, 2,3-diethylbutadiene, and the mixtures thereof.

The terminal blocks of these block copolymers may be the same or different from each other.

The number average molecular weight of these block copolymers is 10,000 to 800,000, preferably 20,000 to 500,000.

The content of the vinyl aromatic compound in these block copolymers is preferably 10 to 70% by weight, more preferably 10 to 55% by weight.

The hydrogenated block copolymer used in the present invention is obtained by selective hydrogenation of the conjugated diene portion of the above-mentioned block copolymer. For example, a hydrogenated block copolymer wherein not more than 20% of the aromatic double bonds in the vinyl aromatic compound polymer block and at least 80% of the aliphatic double bonds in the conjugated diene compound polymer block have been hydrogenated can be obtained by hydrogenating the above-mentioned block copolymer according to the method described in Japanese patent application Kokoku (Post-Exam. Publn.) No. 8704/67.

The "degree of unsaturation of block B" referred to in the present invention means the proportion of carbon-carbon double bonds contained in the block B, and is usually in a range not exceeding 20%. It can be determined by instrumental analysis such as nuclear magnetic resonance method and infrared absorption spectroscopy, and chemcial analysis such as idodometric titration.

These hydrogenated block copolymers can be used each alone or as a mixture of two or more thereof.

In the resin composition of the present invention, the compounding ratio is not specifically limited so long as it is a composition comprising polyamide, PPE and TPE, the diameter of dispersed phase of PPE dispersed in the said composition being 0.6 μm or less and the insoluble portion of the composition after extraction thereof with formic acid followed by chloroform being 20% by weight or more.

More preferably, the content of polyamide resin is in the range of 45 to 75% by weight. A content of less than 40% by weight is unfavorable because sometimes it leads to a low thermal resistance. A content exceeding 75% by weight is unfavorable because sometimes it results in the decrease of low temperature impact strength.

The content of PPE is more preferably in the range of 5 to 40% by weight. A content of less than 5% by weight is unfavorable because it results in the decrease of low temperature impact strength. A content exceeding 40% by weight is unfavorable because it leads to the decrease of thermal stability in molding.

The content of TPE is more preferably in the range of 10 to 30% by weight. A content of less than 10% by weight is unfavorable because it results in the decrease of low temperature impact strength. A content exceeding 30% by weight is unfavorable because it results in a low thermal resistance.

The morphology of the composition of the present invention can be examined by observing with a transmission electron microscope an ultrathin slice of the composition stained and fixed by means of osmium tetroxide and/or ruthenium tetroxide. In the morphology of the composition of this invention, PA forms a continuous phase, whereas PPE and TPE form dispersed phases. More particularly, for example in case of nylon 6,6, the main structure of dispersed phases involve such phase structures as a TPE dispersed phase enveloping PPE, a TPE dispersed phase enveloping PPE and PA, and a TPE dispersed phase enveloping PA; and in case of nylon 6 they involve a TPE dispersed phase enveloping PPE and PA, and a dispersed phase of PPE alone. The PPE dispersed phases range in their size from a very finely dispersed phase to a dispersed phase reaching several $\mu$m in diameter.

As to the diameter of the PPE dispersed phase of the composition according to this invention, it is preferable that most of the PPE dispersed phases have a diameter of 0.6 $\mu$m or less. A diameter of less than 0.01 $\mu$m, namely so fine a dispersion is to make observation with an electron microscope virtually impossible even at a magnification of 10,000, is unfavorable because it leads to the decrease of low temperature impact strength. On the other hand, when the number of particles larger than 0.6 $\mu$m is large, it leads to the decrease of low temperature impact strength and is hence unfavorable.

The diameter of the PPE dispersed phase is measured with an electron photomicrograph taken at a magnification of 10,000. When the phase is elliptic, the length of its major axis, ($\alpha$) and that of the minor axis ($\beta$) (defined herein as the distance between the points at which a perpendicular line drawn through the center of the major axis intersects the ellipsoid) were determined, and a value D calculated from the equation $D=(\alpha+\beta)/2$ is taken as the diameter of the dispersed phase.

The insoluble portion of the composition of the present invention remaining after extraction thereof with formic acid followed by chloroform is preferably 20% by weight or more relative to the total amount of PPE and TPE in the composition. Further, from the viewpoint of practical molding processability, it is not more than 150% by weight. An insoluble proportion of less than 20% by weight is unfavorable because it leads to the decrease of low temperature impact strength and/or to anisotropy of mechanical properties of formed articles.

The insoluble portion is determined in the following manner. A formed article is pulverized mechanically to give powders having a particle diameter of about 0.5 mm or less. After 1 g of the powdery composition is weighed accurately, and mixed with 50 ml of 99% formic acid. The mixture is stirred at room temperature (20° to 25° C.) for 5 hours, filtered through a glass filter to separate insoluble matter, which is then washed with formic acid, water and acetone, and then dried. The insoluble matter is then mixed with 50 ml of chloroform, and the mixture is stirred at room temperature (20° to 25° C.) for 17 hours, and then filtered through a glass filter to separate insoluble matter, which is washed with chloroform and methylene chloride, dried and then weighed. The amount of PPE and TPE in the composition can be determined by first calculating the amount of polyamide from the amount of nitrogen in the composition obtained by elemental analysis and then by substraction. If additives are contained in the composition they are removed before the calculation of the polyamide amount.

The characteristics of the present composition lies in the state of the dispersion of each said component (a), (b) and (c) and the insoluble portion of the composition remaining after the extraction while a polyamide resin, a polyphenylene ether resin and an elastomer of a hydrogenated block copolymer are employed. The above-mentioned characteristics are attained firstly by employing the present process mentioned hereinafter which is entirely different from that of the conventional one.

Although the detailed physico-chemical mechanism showing the excellent effect in the present invention is not clear, it is believed that it can be attained by the process of the present invention that the dispersed state of the present composition is not a mere mixture of PA, PPE and TPE, but the formation of a stable dispersion of PPE and TPE in the PA phase which may have been derived from a strong interaction between them which has never been known, whereby a smaller particle size of PPE specified as in this invention can be formed therein; and that a higher content of said insoluble portion can be attained as a result of employing the present process.

The resin composition of the present invention may be incorporated, at optional steps of its production and molding, with other ingredients including pigments, dyes, reinforcing materials, fillers, thermal stabilizers, antioxidants, weather proofing agents, nucleating agents, lubricant plasticizers, antistatic agents, and other polymers within a range not detrimental to its moldability and mechanical properties.

A preferred process for producing the resin composition of this invention comprises melt-kneading a polyphenylene ether type resin obtained by reacting, in the presence of a radical producing agent, a 1,2-substituted olefinic compound having an acid anhydride structure with a polymer obtained by oxidative polymerization of at least one phenolic compound represented by the general formula

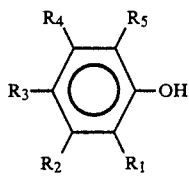

wherein $R_1$, $R_2$, $R_3$, $R_4$ and $R_5$ are, independently, a hydrogen atom, halogen atom, or substituted or unsubstituted hydrocarbon group, provided that at least one of them must be hydrogen; a hydrogenated block copolymer type elastomer obtained by reacting, in the presence of a radical producing agent, a 1,2-substituted olefinic compound having an acid anhydride structure with a hydrogenated block copolymer which is a copolymer containing a vinyl aromatic compound polymer block A and an olefinic compound polymer block B, the degree of unsaturation of the said block B not exceeding 20%; and a polyamide resin. Another process may also be used which comprises melt-kneading optional two components preliminarily and then melt-kneading the remaining component therewith.

As specific examples of 1,2-substituted olefinic compounds having a carboxylic acid group, acid anhydride group, or epoxy group, there may be mentioned maleic anhydride, maleic acid, itaconic anhydride, fumaric acid, methylnadic anhydride, dichloromaleic anhydride, acrylic acid, methacrylic acid, and glycidyl methacrylate.

The radical producing agents usuable in this invention include organic peroxides and diazo compounds known to the art. As specific examples thereof, mention may be made of benzoyl peroxide, dicumyl peroxide, t-butyl hydroperoxide, cumene hydroperoxide, and azobisisobutyronitrile. These radical producing agents may also be used in a combination of two or more kinds thereof.

In executing the present invention, the polyphenylene ether type resin to be used is not specifically limited as to the method of its production. For example, the following methods can be used.

(1) a method which comprises adding a 1,2-substituted olefinic compound having a carboxylic acid group, acid anhydride group, or epoxy group to a solution containing the polymer of a phenolic compound in the presence of a radical producing agent and stirring the resulting mixture at 50° to 200° C. for several ten minutes to several hours.

(2) a method which comprises making the reaction components contact with one another by melt-kneading them in a system containing substantially no solvent or a small amount of solvent.

Method (1) is favorably adopted if the necessary reaction apparatus and purification apparatus are already in hand. Method (2) has advantages in that the modification of the polymer can be performed with inexpensive equipment such as a general purpose twin screw extruder and in a short time without the need of steps of solvent removal and polymer purification.

More preferably, a method is adapted which comprises reacting 0.05 to 15 parts by weight, preferably 0.1 to 7 parts by weight, of a 1,2-substituted olefinic compound having an acid anhydride structure with 100 parts by weight of the polymer of a phenolic compound in the presence of 0.05 to 5 parts by weight, preferably 0.1 to 3 parts by weight, of a radical producing agent in the temperature range of 200° to 350° C., preferably 220° to 330° C.

As specific examples of a 1,2-substituted olefinic compound having a carboxylic acid group or acid anhydride group used in the reaction with the hydrogenated block copolymer, there may be mentioned maleic anhydride, maleic acid, itaconic anhydride, fumaric acid, methylnadic anhydride, dichloromaleic anhydride, acrylic acid, and methacrylic acid.

As to the radical producing agent employed for the reaction of the above-mentioned block copolymer with the above-mentioned 1,2-substituted olefinic compound, there may be used benzoyl peroxide, dicumyl peroxide, t-butyl hydroperoxide, cumene hydroperoxide, azobisisobutyronitrile, and the like. These radical producing agents may also be used in a combination of two or more thereof.

Although no particular limitation is placed as to the method of preparing the hydrogenated block copolymer type elastomer used in the present invention, those methods are not preferable in which the resulting elastomer has a markedly increased melt viscosity and hence a poor processability. A preferred method comprises reacting a hydrogenated block copolymer with an unsaturated carboxylic acid anhydride or with an unsaturated carboxylic acid in the presence of a radical initiator in an extruder.

The amount of the 1,2-substituted olefinic compound having a carboxylic acid group or an acid anhydride group added to the hydrogenated block copolymer is preferably 0.05 to 10 parts by weight, more preferably 0.1 to 5 parts by weight, relative to 100 parts by weight of the hydrogenated block copolymer. When the added amount is less than 0.05% by weight, the resulting polymer is poor in the effect expected for modified hydrogenated block copolymer, and cannot give a satisfactory impact resistance when compounded into a final composition. At an added amount exceeding 10% by weight, further increase in the effect of modification is scarecely observed as compared with products of smaller added amount.

As typical examples of melt-kneading apparatus which can be used in the present invention, mention may be made of extruders, mixing rolls, Banbury mixture, and kneaders. Particularly preferable in this invention is the method of kneading using a twin screw extruder. The kneading temperature, though depending also on the melting temperature of component resins, is preferably 220° to 350° C. for kneading a mixture wherein no polyamide resin is contained, and is a temperature ranging from the melting point of polyamide resin to a temperature of 100° C. higher than its melting point for kneading a mixture wherein polyamide resin is contained.

The composition of the present invention can be processed by known methods of forming generally used for thermoplastic resins, for example injection molding, extrusion, flow molding and vacuum forming.

EFFECT OF THE INVENTION

Products obtained by simply mixing by mechanical means such polymers incompatible with one another as PA resin, a phenolic compound polymer, and a block copolymer which is a copolymer containing a vinyl aromatic compound polymer block A and an olefinic compound polymer block B, the degree of unsaturation of the block B not exceeding 20%, do not form a dispersed phase; or even when they form a dispersed phase, they give rise to macroscopic phase separation in molding; or even when such phenomena do not occur, they are very brittle.

Since the polyphenylene ether type resin used in the present invention is a product obtained by reacting a 1,2-substituted olefinic compound having a carboxylic acid group, acid anhydride group, or epoxy group with a phenolic compound polymer, it can form, in the final resin composition, dispersed phases wherein amount all of the particles are present as fine particles of 0.6 μm or less.

Also, since the block copolymer type elastomer used in this invention is a product obtained by reacting a 1,2-substituted olefinic compound having a carboxylic acid group or acid anhydride group with the above-mentioned block copolymer, it can form dispersed phases in the composition.

Further, in the polyphenylene ether type resin and the block copolymer type elastomer, which are polymers to which a 1,2-substituted olefinic compound having a carboxylic acid group, acid anhydride group, or epoxy group has been reacted, it is considered that the double bond moiety of the olefinic compound has undergone grafting to leave a polar group, namely carboxylic acid group, acid anhydride group or epoxy group, bonded to the main chain of PPE and TPE. It is estimated that the above-mentioned polar group reacts with the terminal amino group or carboxylic acid group of PA and the amido group present in its main chain, whereby the PPE dispersed phase and TPE dispersed phase are stabilized. Further, it is estimated that said reaction results in the increase of insoluble portion remaining after extraction with formic acid, a solvent for PA, and with chloroform, a solvent for PPE and TPE, thereby to give a composition which has an insoluble portion of 20% by weight or more and is of excellent mechanical properties and low anisotropy thereof.

EXAMPLE

The present invention will be further described below with reference to Examples in order to be more clearly understood. However, the scope of the present invention is not limited to these Examples. In the Examples, all "parts" are part by weight.

EXAMPLE 1

(1) Preparation of maleic anhydride-modified polyphenylene ether type resin

Poly(2,6-dimethylphenylene-1,4-ether) with a number average polymerization degree of 140, di-t-butyl peroxide, and maleic anhydride are dry-blended in a weight ratio of 100/1/5 at room temperature. By means of a twin screw extruder with vent of reverse rotation type, a screw diameter of 30 mm and L/D of 30, the blend is melted under conditions of a cylinder temperature of 300° C. and a screw rotating speed of 75 rpm, then extruded at a residence time of 1 minute, passed through a cooling bath, and then pelletized. A 0.05 g portion of the pellet is formed into film of about 15 μm thickness by the use of chloroform. The film is then heated with ethanol under reflux in a Soxhlet's extractor for 10 hours. It is then dried and used as the sample for infrared spectrophotometry. The presence of the —$CO_2$— structure in the sample originating from the reaction with maleic anhydride is confirmed from the analysis of the absorption peak of 1700~1800 $cm^{-1}$ in the infrared absorption spectrum.

(2) Preparation of maleic anhydride-modified hydrogenated block copolymer

A uniform mixture of 100 parts by weight of a hydrogenated block copolymer (Kraton G1652, mfd. by Shell Chemical Co.; styrene content; 29%; SEBS-type, S denoting styrene and EB denoting ethylene.butylene), 1.2 parts by weight of maleic anhydride, and 0.3 part by weight of Perhexa (a trade name of a peroxide, mfd. by Nippon Oil & Fat Co., Ltd.) is fed to a twin screw extruder (screw diameter 45 mm; L/D: 33; with vent) and subjected to maleic acid addition reaction at a cylinder temperature of 260° C. while unreacted maleic anhydride is being removed by suction through the vent hole. The resulting modified hydrogenated block copolymer is dried by heating it under reduced pressure and analyzed to show an addition amount of maleic anhydride of 0.6% by weight. The addition amount of maleic anhydride is determined by titration with sodium methylate.

(3) Preparation of composition

A mixture of 50 parts of nylon 6,6 (Leona 1300S, mfd. by Asahi Chemical Industry Co., Ltd.), 25 parts of the maleic anhydride-modified polyphenylene ether type resin obtained in (1) above, and 25 parts of the maleic anhydride-modified hydrogenated block copolymer obtained in (2) above is extruded through a twin screw extruder (screw diameter: 45 mm, L/D: 33) set at 300° C., then passed through a cooling bath, and pelletized. The pellets are dried at 80° C. for 8 hours under reduced pressure and then injection-molded under the following conditions to obtain molded pieces for determination of their properties.

| Injection molding machine | 1 oz. |
| --- | --- |
| Cylinder temperature | 290° C. |
| Injection pressure | 700 $kg/cm^2$ |
| Injection time | 15 seconds |
| Cooling time | 20 seconds |
| Mold temperature | 80° C. |

(4) Determination of properties

Thermal resistance: A ⅛" thick test piece is used to determine its heat distortion temperature at 4.6 $kg/cm^2$ load under an absolte dry condition according to ASTM D 648.

Impact resistance: Izod impact strength is determined by using a ⅛" thick test piece with notch at room temperature (23° C.) and under an absolute dry condition according to ASTM D 256.

Low temperature impact resistance: Izod impact strength at −30° C. was determined by using a ⅛" thick test piece with notch.

Rigidity: Flexural modulus is determined by using a ⅛" thick test piece under absolute dry condition according to ASTM D790-80.

Anisotropy of mechanical properties: A test piece having a notch in the direction of resin flow cut from the gate part and a test piece having a notch in the direction perpendicular to resin flow cut from the central part are prepared from flat plates of 12×8 cm and ⅛" thickness. Izod impact strength is determined according to ASTM D 256 with the test pieces under an absolute dry condition. The anisotropy of mechanical properties is defined in terms of the ratio of the impact strength at the gate part to that at the central part and calculated by the following equation.

Anisotrophy of mechanical properties =

$$\frac{\text{Impact strength at gate part}}{\text{Impact strength at central part}} \times 100(\%)$$

The results of these determinations are shown in Table 1. It can be seen that the composition has remarkably excellent impact strength not only at room temperature but also at −30° C., and has also excellent thermal resistance; further it has very well balanced mechanical properties, the anisotropy of mechanical properties being 91%.

Figure 2:

FIGS. 1 and 2 are transmission electron photomicrographs of molded articles. The photograph of FIG. 2 shows the morphology of a molded article formed after residence in an injection machine at 310° C. for 10 minutes. Though the dispersed phases of elastomer are in an agglomerated states, the PPE dispersed phase do not form agglomeration and most of the dispersed phases are about 0.5 μm or less in size; the number of dispersed phases larger than 0.6 μm is found to be only one. The impact strength at 23° C. of the said molded article subjected to 10 minutes of residence is 55 kg·cm/cm, a property of a considerably high level, revealing that the composition shows remarkably excellent residence stability in molding machines.

COMPARATIVE EXAMPLE 1

The properties of the nylon 6,6 resin used in Example 1 are shown in Table 1.

COMPARATIVE EXAMPLE 2

Figure 3:
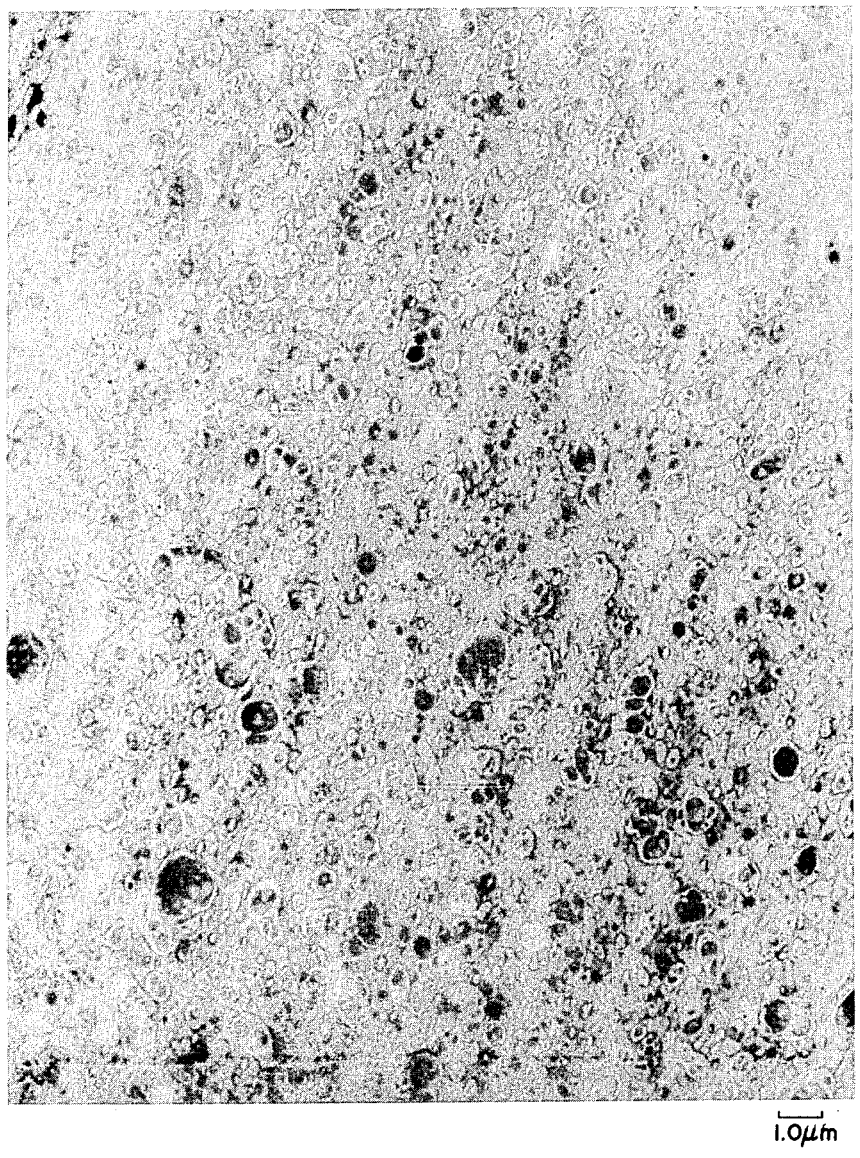

The procedures of Example 1 are repeated by using a hydrogenated block copolymer (Kraton G1652, mfd. by Shell Chemical Co.) in place of the maleic anhydride-modified hydrogenated block copolymer used in Example 1. The results, shown in Table 1, reveals that the resulting composition is very poor in anisotropy of mechanical properties. FIG. 3 shows the electron photomicrograph of the composition.

COMPARATIVE EXAMPLE 3

Figure 4:
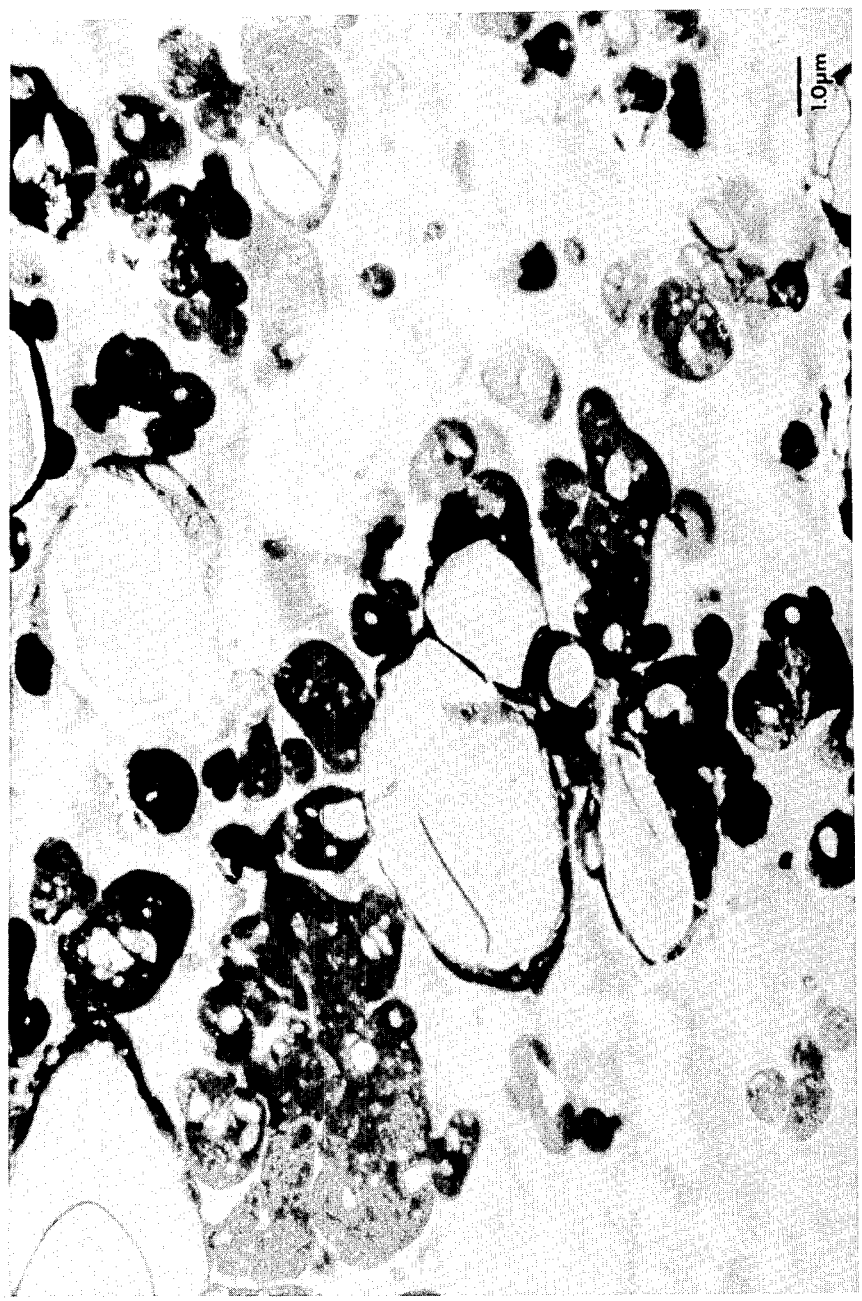
FIG. 4 is an electron photomicrograph of the composition of Comparative Example 4 which has been stained with osmium tetroxide lightly and then with ruthenium tetroxide. Deeply stained portions are dispersed phase of TPE; white, not stained portions are the dispersed phases of PPE; and lightly stained portions are PA phases.

The procedures of Example 1 are repeated except that unmodified polyphenylene ether is used in place of the maleic anhydride-modified polyphenylene ether used in Example 1, and the results obtained are shown in Table 1. The resulting composition shows low values both in low temperature impact strength and thermal resistance. The electron photomicrograph of the composition is shown in FIG. 4.

COMPARATIVE EXAMPLE 4

Figure 5:
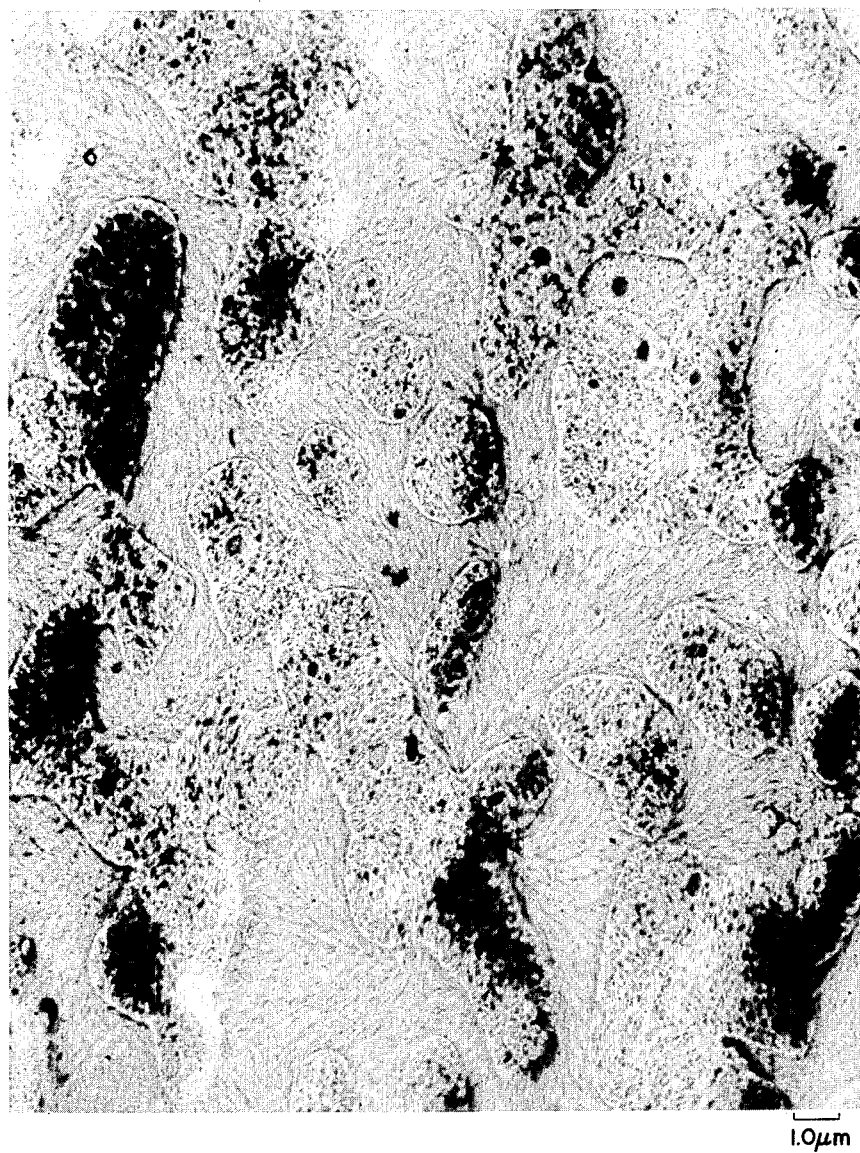

Under the same conditions as in Example 1, a mixture of 50 parts of nylon 6,6 (Leona 1300 S, mfd. by Asahi Chemical Industry Co., Ltd.), 25 parts of poly(2,6-dimethylphenylene-1,4-ether) having a number average polymerization degree of 140, 25 parts of a hydrogenated block copolymer (Kraton G1652, mfd. by Shell Chemical Co.) and 1 part of maleic anhydride is melt-kneaded and injection-molded to determine their properties. The results are shown in Table 1. The electron photomicrograph of the resulting composition is shown in FIG. 5.

COMPARATIVE EXAMPLE 5

Figure 6:
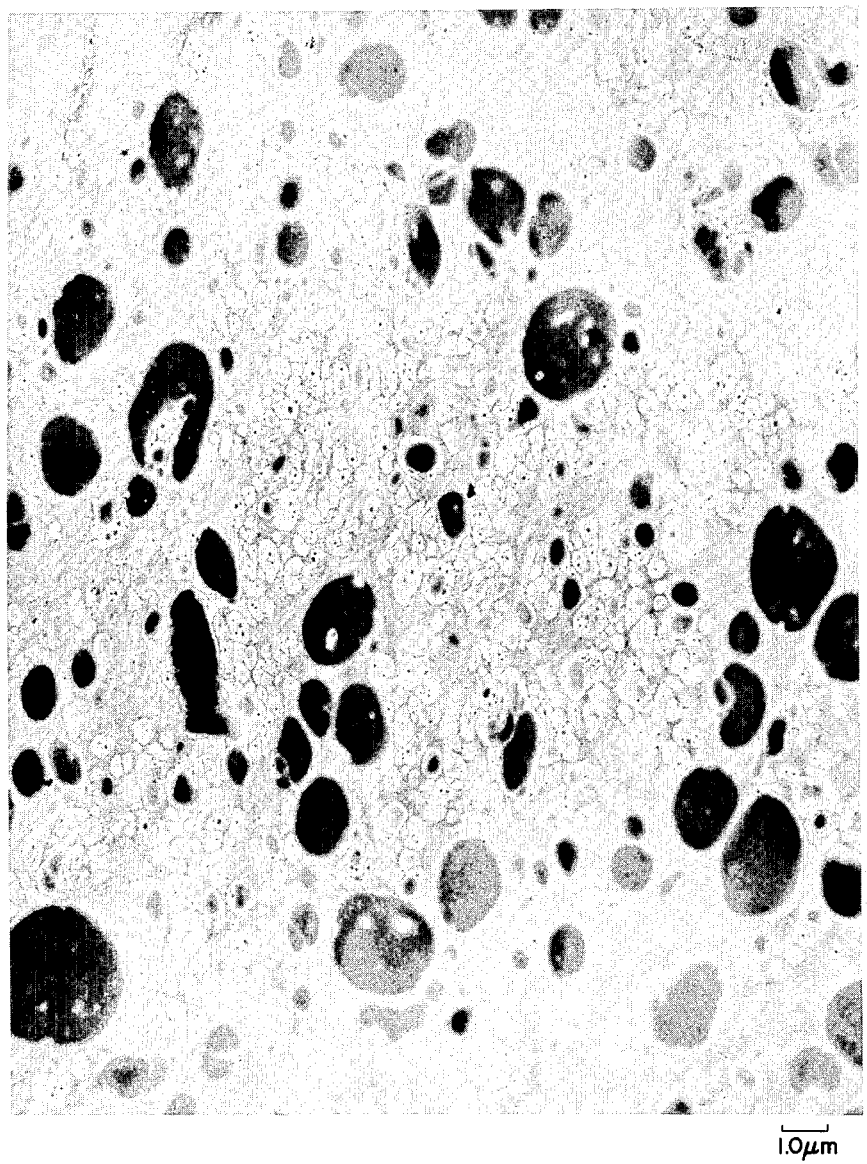
Figure 7:
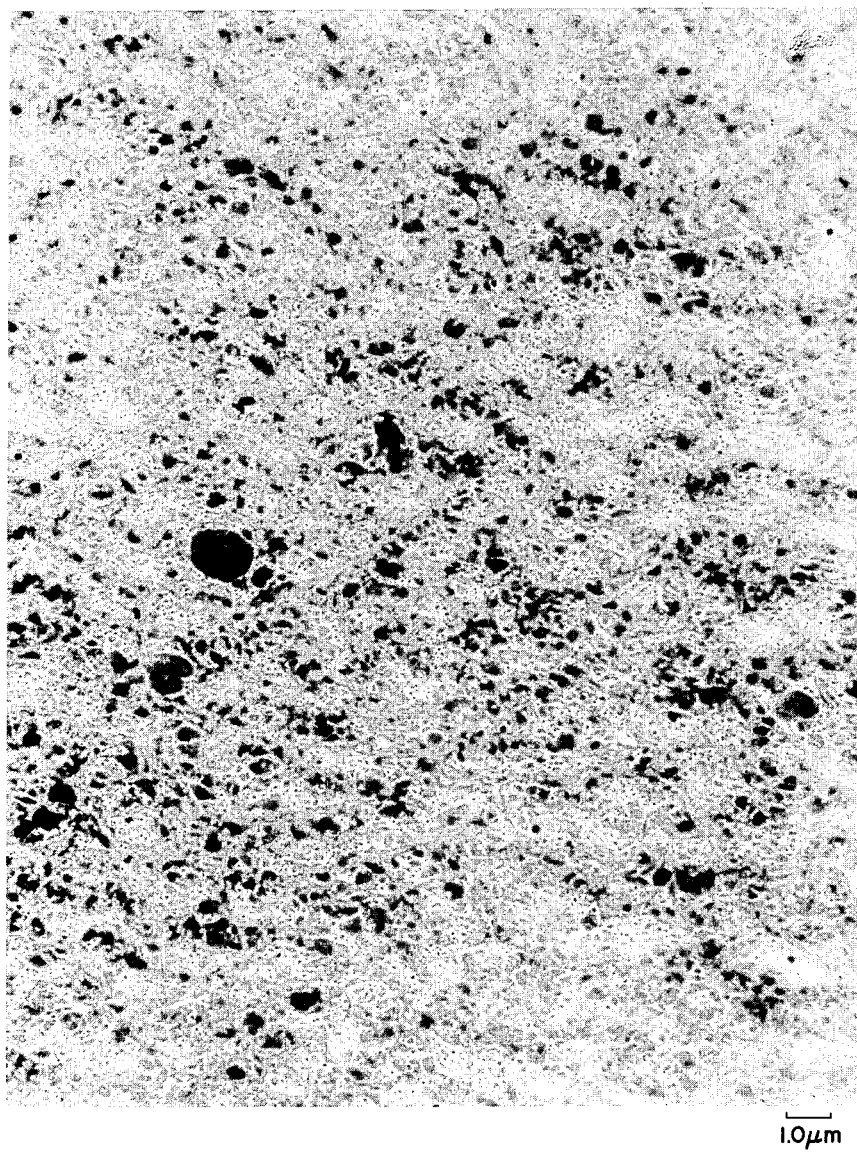
Figure 8:
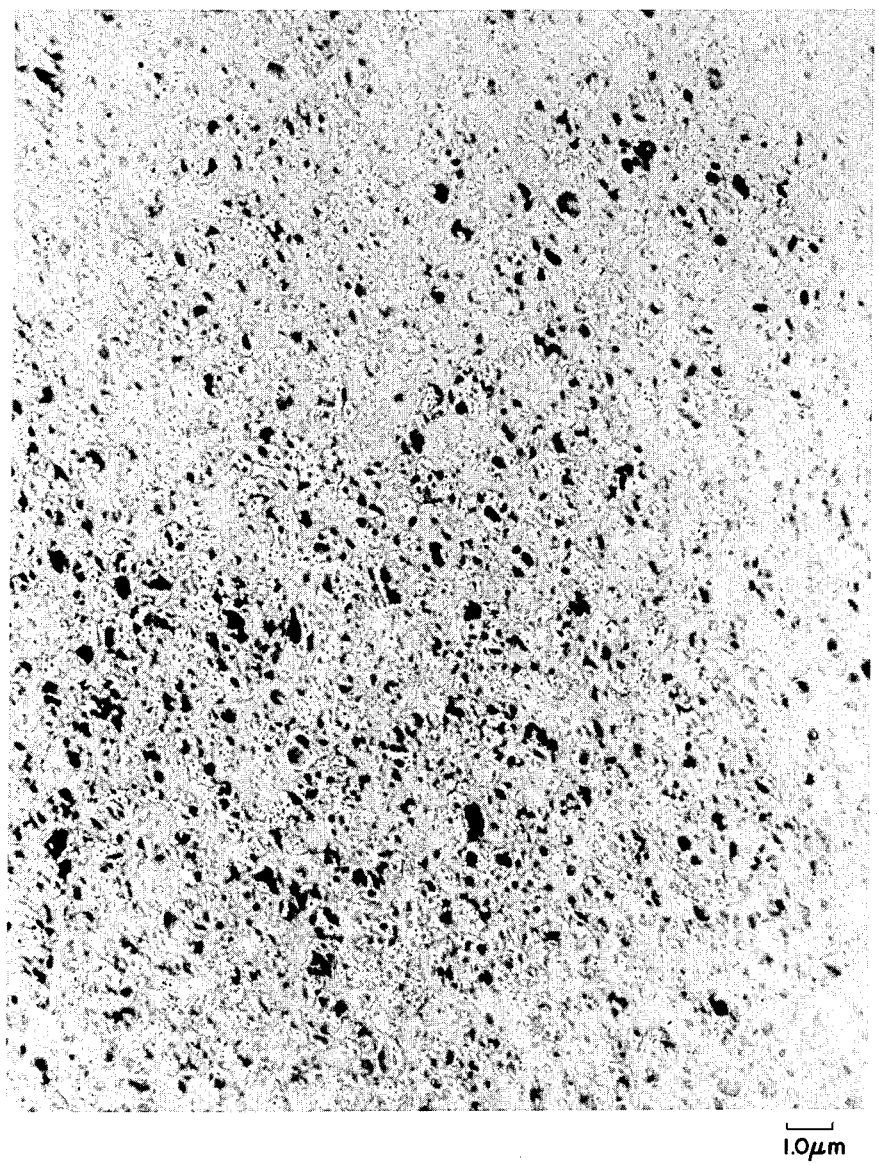
Figure 9:
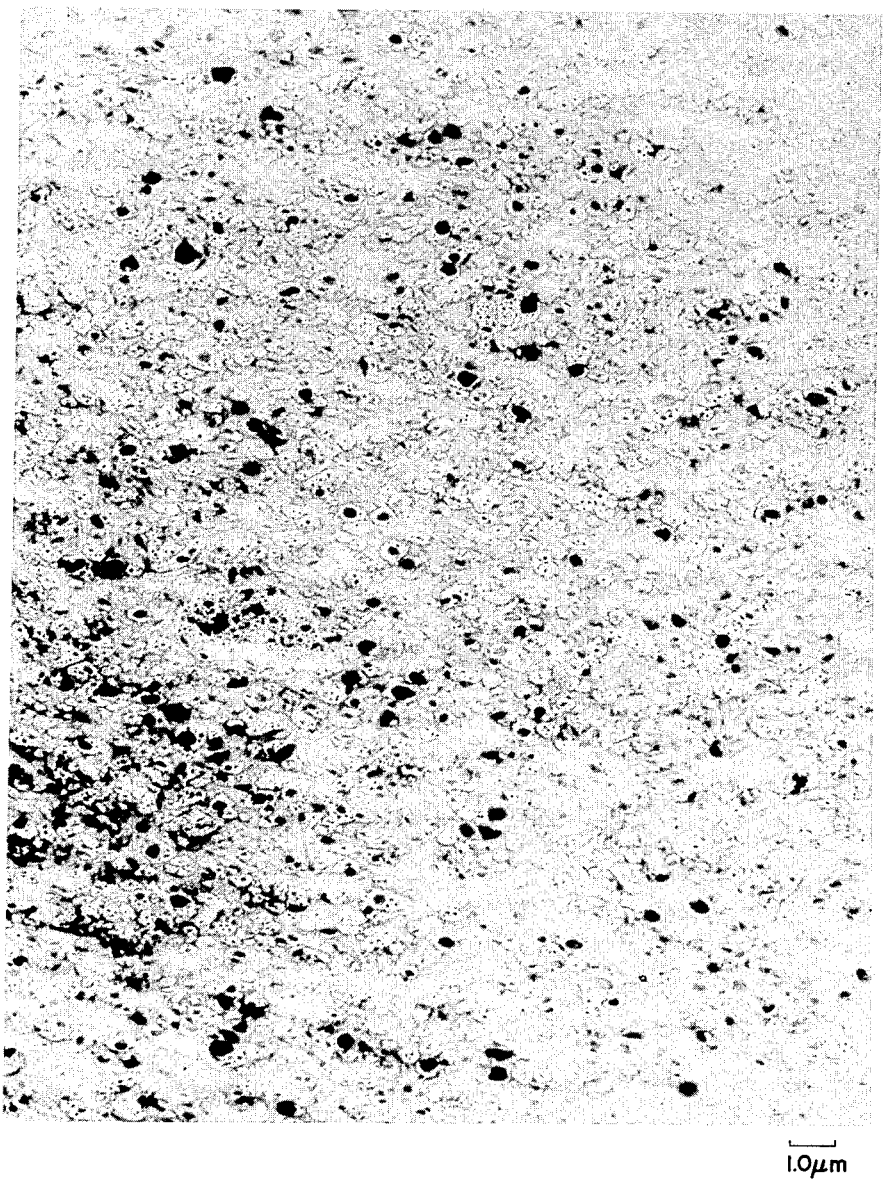
Figure 10:
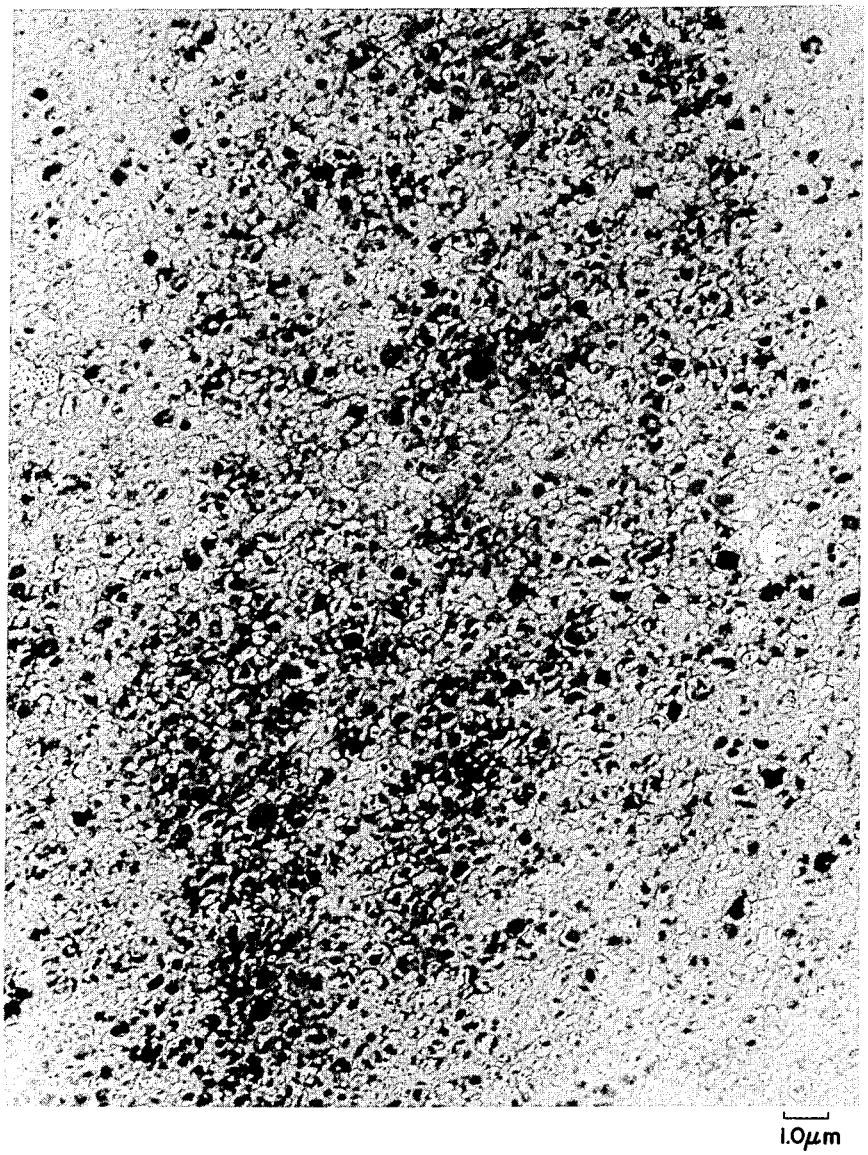
Figure 11:
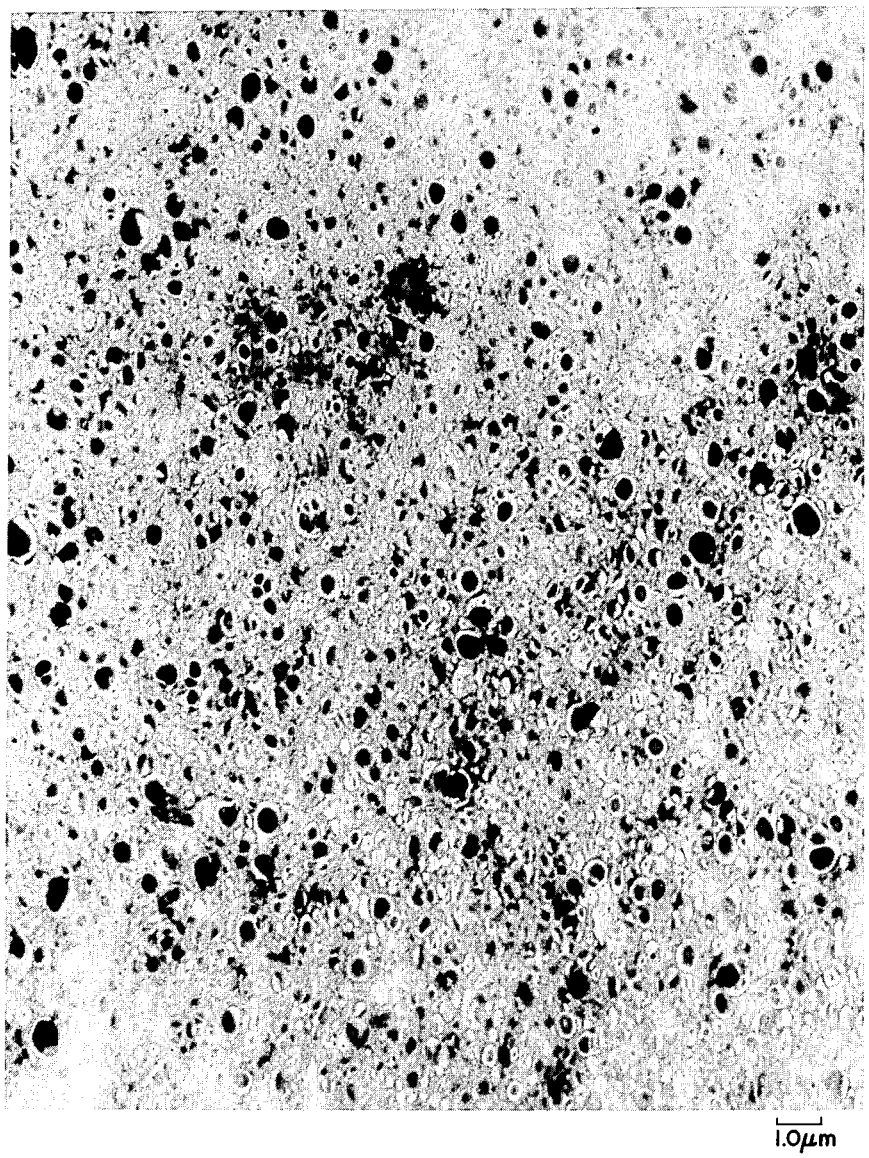

The procedures of Comparative Example 4 are repeated except that 0.3 part of di-t-butyl peroxide is further added to the formulation of Comparative Example 4. The results obtained are shown in Table 1. The electron photomicrograph of the resulting composition is shown in FIG. 6.

TABLE 1

| | Unit | Example 1 | Comparative Example 1 | Comparative Example 2 | Comparative Example 3 | Comparative Example 4 | Comparative Example 5 |
|---|---|---|---|---|---|---|---|
| Nylon 6,6 | part | 50 | 100 | 50 | 50 | 50 | 50 |
| Maleic anhydride-modified polyphenylene ether | " | 25 | | 25 | | | |
| Polyphenylene ether | " | | | | 25 | 25 | 25 |
| Maleic anhydride-modified hydrogenated block copolymer | " | 25 | | | 25 | | |
| Hydrogenated block copolymer | " | | | 25 | | 25 | 25 |
| Maleic anhydride | " | | | | | 1 | 1 |
| Peroxide | " | | | | | | 0.3 |
| Particle diameter of PPE dispersed phase | μm | Mostly 0.5 μm≧*1 | | ~1.4 μm*2 | ~4.3 μm | All 0.6 μm≧ | ~2.4 μm |
| $\left[\frac{\text{Insolubles in formic acid and chloroform}}{(\text{PPE} + \text{TPE})}\right] \times 100$ | % | 60 | | 45 | 27 | 0.3 | 43 |
| Izod impact strength at 23° C. | kg · cm/cm | 69 | 5 | 75 | 11 | 22 | 25 |
| Izod impact strength at −30° C. | kg ·cm/cm | 48 | 3 | 38 | 10 | 8 | 11 |
| Heat distortion temperature (4.6 kg/cm²) | °C. | 158 | 230 | 169 | 103 | 134 | 170 |
| Flexural modulus | kg/cm² | 17,300 | 29,000 | 15,000 | 12,200 | 15,600 | 16,100 |
| Anisotropy of mechanical properties (Izod strength at gate/ izod strength at center) × 100 | % | 91 | | 22 | | | |

Note
*1number of dispersed phase larger than 0.6 μm . . . 1
*2number of dispersed phase larger than 0.6 μm . . . 13

EXAMPLES 2 TO 10

Compositions were prepared from mixtures comprising the three components, used in Example 1, in proportions shown in Table 2, and their properties are shown in Table 2.

Compositions were obtained which were remarkably excellent in impact strength, particularly that at $-30°$ C., and also excellent in thermal resistance and of low level of anisotropy of mechanical properties.

The test pieces obtained by molding the compositions of Examples 4, 6 and 9 after residence of 10 minutes at 310° C. in an injection machine showed considerably high values of Izod impact strength at 23° C. of 77, 73 and 65 kg·cm/cm, respectively, revealing also their resistance stability in molding machines.

FIGS. 7 to 11 show the electron photomicrographs of the compositions of Examples 2, 3, 4, 7 and 9, respectively.

COMPARATIVE EXAMPLES 6 AND 7

Compositions were obtained by melt-kneading, by extrusion, mixtures comprising the three components, used in Example 1, in proportions shown in Table 2. Their properties are shown in Table 2.

The compositions of Comparative Examples 6 and 7 are both excellent in thermal resistance but show low Izod impact strength at $-30°$ C. Further, when they are retained in an injection molding machine at 310° C., increase of their viscosity is observed after 5 minutes and injection molding becomes impossible after 10 minutes of residence.

Figure 12:
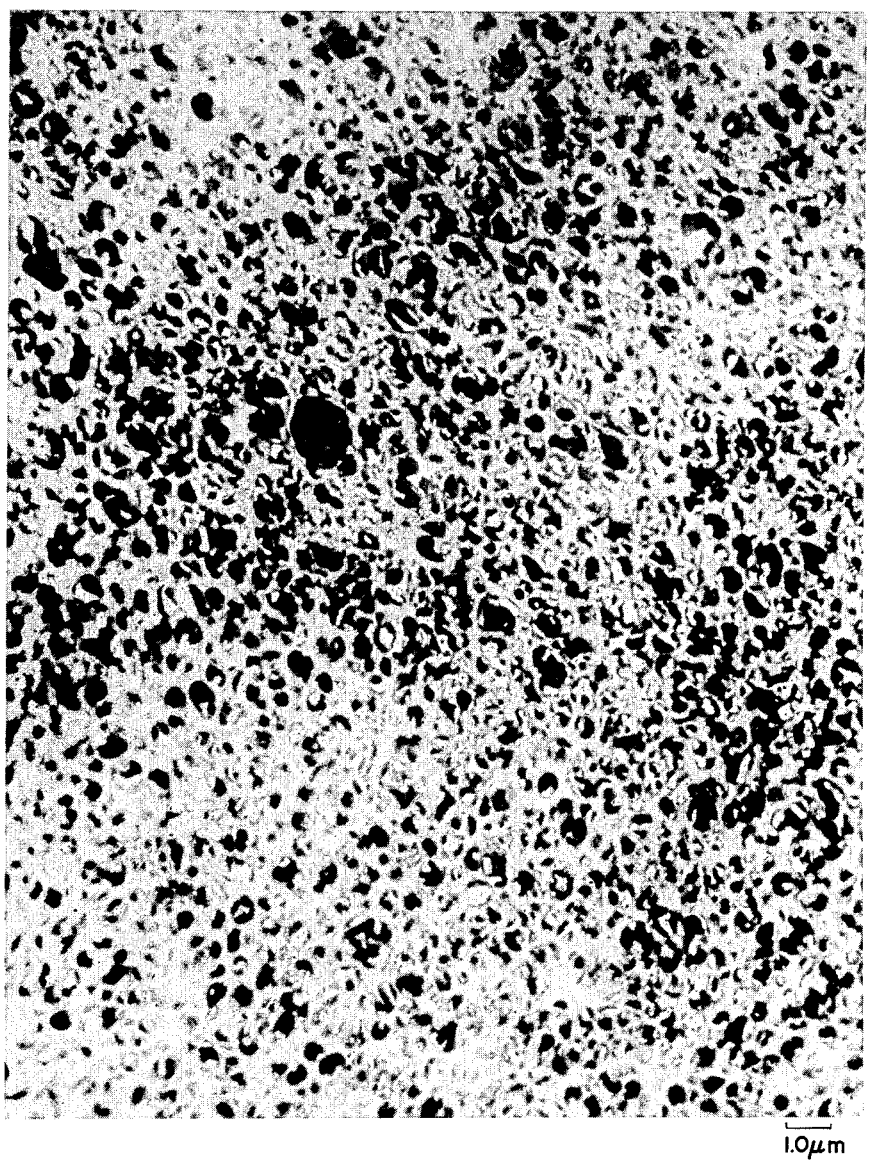

FIG. 12 shows the electron photomicrograph of the composition of Comparative Example 6.

TABLE 2

| | Unit | Example 2 | Example 3 | Example 4 | Example 5 | Example 6 | Example 7 |
|---|---|---|---|---|---|---|---|
| Nylon 6,6 | part | 40 | 45 | 55 | 65 | 50 | 50 |
| Maleic anhydride-modified polyphenylene ether | " | 35 | 30 | 20 | 10 | 20 | 30 |
| Maleic anhydride-modified hydrogenated block copolymer | " | 25 | 25 | 25 | 25 | 30 | 20 |
| Particle diameter of PPE dispersed phase | μm | Mostly*1 $0.6\geqq$ | Mostly*2 $0.5\geqq$ | All $0.5\geqq$ | All $0.5\geqq$ | Mostly*3 $0.6\geqq$ | All $0.5\geqq$ |
| $\left[\dfrac{\text{Insoluble in formic acid and chloroform}}{(\text{PPE} + \text{TPE})}\right] \times 100$ | % | 37 | 41 | 54 | 50 | 46 | 49 |
| Izod impact strength at 23° C. | kg·cm/cm | 59 | 61 | 88 | 103 | 83 | 77 |
| Izod impact strength at $-30°$ C. | kg·cm/cm | 27 | 36 | 46 | 33 | 68 | 26 |
| Heat distortion temperature (4.6 kg/cm$^2$) | °C. | 160 | 160 | 154 | 141 | 131 | 168 |
| Flexural modulus | kg/cm$^2$ | 15,500 | 16,300 | 16,600 | 16,600 | 14,700 | 19,900 |
| Anisotropy of mechanical properties $\left[\dfrac{\text{Izod strength at gate}}{\text{Izod strength at center}}\right] \times 100$ | % | 90 | 94 | 81 | 75 | 91 | 93 |

| | Unit | Example 8 | Example 9 | Example 10 | Comparative Example 6 | Comparative Example 7 |
|---|---|---|---|---|---|---|
| Nylon 6,6 | part | 60 | 65 | 50 | 40 | 45 |
| Maleic anhydride-modified polyphenylene ether | " | 20 | 20 | 35 | 45 | 50 |
| Maleic anhydride-modified hydrogenated block copolymer | " | 20 | 15 | 15 | 15 | 5 |
| Particle diameter of PPE dispersed phase | μm | All $0.6\geqq$ | Mostly*4 $0.6\geqq$ | Mostly*5 $0.6\geqq$ | Not particulate | Not particulate |
| $\left[\dfrac{\text{Insoluble in formic acid and chloroform}}{(\text{PPE} + \text{TPE})}\right] \times 100$ | % | 43 | 45 | 42 | 32 | 25 |
| Izod impact strength at 23° C. | kg·cm/cm | 90 | 94 | 65 | 52 | 7 |
| Izod impact strength at $-30°$ C. | kg·cm/cm | 30 | 22 | 23 | 12 | 4 |
| Heat distortion temperature (4.6 kg/cm$^2$) | °C. | 163 | 175 | 184 | 181 | 203 |
| Flexural modulus | kg/cm$^2$ | 19,900 | 21,500 | 21,000 | 21,000 | 22,000 |
| Anisotropy of mechanical properties | | | | | | |

TABLE 2-continued

| | | % | 77 | 73 | 84 |
|---|---|---|---|---|---|
| $\left[\dfrac{\text{Izod strength at gate}}{\text{Izod strength at center}}\right] \times 100$ | | | | | |

Note:
*[1]Number of dispersed phase larger than 0.6 μm ... 4
*[2]Number of dispersed phase larger than 0.6 μm ... 1
*[3]Number of dispersed phase larger than 0.6 μm ... 1
*[4]Number of dispersed phase larger than 0.6 μm ... 3
*[5]Number of dispersed phase larger than 0.6 μm ... 2

EXAMPLE 11

A mixture of 50 parts of nylon 6 (Amilan 1017, mfd. by Toray Industrials, Inc.) 25 parts of the maleic anhydride-modified polyphenylene ether used in Example 1, and 25 parts of the maleic anhydride-modified hydrogenated block copolymer used in Example 1 is extruded through a twin screw extruder (screw diameter: 45 mm, L/D: 33) set at 300° C., then passed through a cooling bath and pelletized. The pellets thus obtained are dried at 80° C. under reduced pressure and then injection-molded under the following conditions to obtain test pieces for determination of their properties.

| | |
|---|---|
| Injection molding machine | 1 oz. |
| Cylinder temperature | 290° C. |
| Injection pressure | 700 kg/cm² |
| Injection time | 15 seconds |
| Cooling time | 20 seconds |
| Mold temperature | 80° C. |

The results thus obtained are shown in Table 3. The electron photomicrograph of the composition is shown in FIG. 13.

COMPARATIVE EXAMPLE 8

The properties of the nylon 6 resin used in Example 11 is shown in Table 3.

TABLE 3

| | Unit | Example 11 | Comparative Example 8 |
|---|---|---|---|
| Nylon 6 | part | 50 | 100 |
| Maleic anhydride-modified polyphenylene ether | '' | 25 | |
| Maleic anhydride-modified hydrogenated block copolymer | '' | 25 | |
| Particle diameter of PPE dispersed phase | μm | All 0.5≧ | |
| $\left[\dfrac{\text{Insolubles in formic acid and chloroform}}{(\text{PPE} + \text{TPE})}\right] \times 100$ | % | 81 | |
| Izod impact strength at 23° C. | Kg·cm/cm | 82 | 5 |
| Izod impact strength at −30° C. | kg·cm/cm | 43 | |
| Heat distortion temperature (4.6 kg/cm²) | °C. | 145 | 190 |
| Flexural modulus | Kg/cm² | 19,200 | 29,000 |
| Anisotropy of mechanical properties | | | |
| $\left[\dfrac{\text{Izod strength at gate}}{\text{Izod strength at center}}\right] \times 100$ | % | 92 | |

INDUSTRIAL APPLICABILITY

One feature of the composition of the present invention is its excellent impact resistance, particularly an excellent impact strength at low temperature, combined with excellent thermal resistance.

Another feature of the composition is its low level of anisotropy of mechanical properties. Resultantly, the composition can be used in a wide field of application without being restricted as to forming techniques and uses.

A further is that the composition is stable even when retained in molding machines for a long time in molding. Resultantly, it is suitable also for forming a large-size articles which require a long residence time.

Further, since a large amount of polyphenylene ether type resin and of block copolymer type resin, which are both nonhydroscopic, can be added to polyamide resin according to the process of the present invention, it also exhibits an effect of decreasing the moisture absorption of polyamide resin simultaneously with improving the dimensional stability.

We claim:

1. An impact-resistant polyamide resin composition which comprises
   (a) a polyamide resin,
   (b) a polyphenylene ether resin, and
   (c) a hydrogenated block copolymer elastomer which comprises a hydrogenated block copolymer comprising a vinyl aromatic compound polymer block A and a conjugated diene compound polymer block B, the degree of unsaturation of block B not exceeding 20%,
   the diameter of the dispersed phase of the polyphenylene ether resin dispersed in the composition being 0.6 μm or less, and the insoluble portion of the composition remaining after extraction thereof with formic acid followed by chloroform being 20% by weight or more relative to the total amount of the polyphenylene ether resin and the hydrogenated block copolymer elastomer present in the composition.

2. The impact-resistant polyamide resin composition according to claim 1 which comprises 40 to 75% by weight of the polyamide resin (a), 5 to 40% by weight of the polyphenylene ether resin (b), and 10 to 30% by weight of the hydrogenated block copolymer elastomer (c).

3. The impact-resistant polyamide resin composition according to claims 1 or 2, wherein the content of said vinyl aromatic compound in said block copolymer elastomer is 10 to 70 parts by weight per 100 parts by weight of said block copolymer.

4. The impact-resistance polyamide resin composition according to claim 3, wherein said content of said vinyl aromatic compound in said block copolymer elastomer is 10 to 55 parts by weight per 100 parts by weight of said block copolymer elastomer.

* * * * *